United States Patent
Nakamura et al.

(10) Patent No.: US 9,145,925 B2
(45) Date of Patent: Sep. 29, 2015

(54) TOLERANCE RING FOR TORQUE TRANSMISSION DEVICE

(75) Inventors: Yuji Nakamura, Aichi (JP); Satoru Kondo, Aichi (JP)

(73) Assignee: Togo Seisakusyo Corrporation, Aichi-ken (JP)

( * ) Notice: Subject to any disclaimer, the term of this patent is extended or adjusted under 35 U.S.C. 154(b) by 0 days.

(21) Appl. No.: 13/808,553

(22) PCT Filed: Aug. 31, 2011

(86) PCT No.: PCT/JP2011/069742
§ 371 (c)(1),
(2), (4) Date: Jan. 4, 2013

(87) PCT Pub. No.: WO2012/029841
PCT Pub. Date: Mar. 8, 2012

(65) Prior Publication Data
US 2013/0105267 A1 May 2, 2013

(30) Foreign Application Priority Data
Sep. 3, 2010 (JP) ................................. 2010-197573

(51) Int. Cl.
| F16D 7/02 | (2006.01) |
| F16D 1/08 | (2006.01) |
| F16C 35/02 | (2006.01) |
| F16D 1/06 | (2006.01) |

(52) U.S. Cl.
CPC . *F16D 7/02* (2013.01); *F16C 35/02* (2013.01); *F16D 1/0835* (2013.01); *F16D 7/021* (2013.01); *F16D 2001/062* (2013.01)

(58) Field of Classification Search
CPC ......... F16D 1/0835; F16D 7/021; F16D 7/02; F16D 2001/062; F16C 27/02; F16C 2370/12; F16C 35/02; G11B 5/4813
USPC .................. 403/367, 371, 372; 411/520, 521; 384/535, 581; 360/97.02, 265.2, 265.6, 360/266.1
See application file for complete search history.

(56) References Cited

U.S. PATENT DOCUMENTS

| 3,633,398 | A | * | 1/1972 | Koch | 72/131 |
| 4,286,894 | A | * | 9/1981 | Rongley | 403/372 |
| 4,376,254 | A | * | 3/1983 | Hellmann | 310/235 |
| 4,828,423 | A | * | 5/1989 | Cramer et al. | 403/372 |
| 4,981,390 | A | * | 1/1991 | Cramer et al. | 403/371 |
| 5,315,465 | A | * | 5/1994 | Blanks | 360/265.6 |
| 7,611,303 | B2 | * | 11/2009 | Hanrahan et al. | 403/372 |

(Continued)

FOREIGN PATENT DOCUMENTS

| JP | 2002-087294 A | 3/2002 |
| JP | 2002-308119 A | 10/2002 |

(Continued)

*Primary Examiner* — Joshua Kennedy
(74) *Attorney, Agent, or Firm* — Christensen Fonder P.A.

(57) ABSTRACT

This tolerance ring, which is for a torque transmission device, preferably has a ring body that comprises an elastic plate and is roughly a hollow cylindrical shape having a pair of edges that extend in the axial direction. The ring body has: a plurality of protrusions that are arranged along the peripheral direction and preferably protrude in the radial direction; a first region having a number of the protrusions including the pair of protrusions adjacent to the pair of edges; and that is positioned at the diametrically opposite side from the first region. The pair of protrusions has the same rigidity as one of the protrusions of the second region.

14 Claims, 14 Drawing Sheets

(56) References Cited

U.S. PATENT DOCUMENTS

| | | | |
|---|---|---|---|
| 7,850,389 B2* | 12/2010 | Hanrahan et al. | 403/372 |
| 7,978,437 B2* | 7/2011 | Hanrahan et al. | 360/265.6 |
| 8,363,359 B2* | 1/2013 | Slayne et al. | 360/265.6 |
| 8,385,024 B2* | 2/2013 | Schmidt et al. | 360/265.6 |
| 8,482,882 B2* | 7/2013 | Slayne et al. | 360/265.6 |
| 2007/0096572 A1* | 5/2007 | Watkins et al. | 310/90 |
| 2008/0043374 A1* | 2/2008 | Hanrahan et al. | 360/265.6 |
| 2008/0043375 A1* | 2/2008 | Hanrahan et al. | 360/265.6 |
| 2008/0199254 A1* | 8/2008 | Baker et al. | 403/372 |
| 2008/0266717 A1 | 10/2008 | Court et al. | |
| 2009/0256341 A1* | 10/2009 | Okada et al. | 280/775 |
| 2010/0003076 A1* | 1/2010 | Slayne | 403/365 |
| 2011/0076096 A1* | 3/2011 | Slayne et al. | 403/372 |
| 2013/0315655 A1* | 11/2013 | Nias et al. | 403/119 |
| 2013/0315664 A1* | 11/2013 | Nias et al. | 403/365 |
| 2014/0017105 A1* | 1/2014 | Pennsiriwongse | 417/437 |

FOREIGN PATENT DOCUMENTS

| | | |
|---|---|---|
| JP | 2005-114025 A | 4/2005 |
| JP | 2010-064562 A | 3/2010 |
| JP | 2010-525276 A | 7/2010 |
| WO | WO 2008/021890 A2 | 2/2008 |
| WO | WO 2008/022082 A2 | 2/2008 |

* cited by examiner

TOLERANCE RING FOR TORQUE TRANSMISSION DEVICE

PRIORITY CLAIM

The present application is a National Phase entry of PCT Application No. PCT/JP2011/069742, filed Aug. 31, 2011, which claims priority from Japanese Patent Application No. 2010-197573, filed Sep. 3, 2010, the disclosures of which are hereby incorporated by reference herein in their entirety.

FIELD OF THE INVENTION

The present invention relates to tolerance rings for torque transmission devices.

DESCRIPTION OF THE RELATED ART

A conventional example will be described. FIG. 26 is a cross-sectional view of a conventional torque transmission device. As shown in FIG. 26, the torque transmission device T has an inner axial member S1, an outer axial member S2, which are placed concentrically, and a tolerance ring 10 fitted in an annular space between the axial members S1 and S2. The inner axial member S1 has an outer peripheral surface S1a in a hollow cylinder shape having a predetermined outside diameter. Also, the outer axial member S2 has an inner peripheral surface S2a in a hollow cylinder shape having a larger inside diameter than the outside diameter of the outer peripheral surface S1a of the inner axial member S1. The tolerance ring 10 works as a torque limiter for allowing relative rotation between the axial members S1 and S2 such that when an input torque is lower than a predetermined torque, the axial members S1 and S2 rotate together. When the input torque is higher than the predetermined torque, the axial members S1 and S2 slide against each other. A tolerance ring working as torque limiter is described in, for example, Japanese Laid-Open Patent Publication No. 2002-308119.

One example of the tolerance ring 10 used in the torque transmission device T will be described. FIG. 27 is a perspective view showing a tolerance ring. FIG. 28 is a side view along an axial direction. FIG. 29 is a top view of a developed tolerance ring. FIG. 30 is a cross-sectional view along line XXX-XXX in FIG. 29. FIG. 31 is a cross-sectional view along line XXXI-XXXI in FIG. 29.

As shown in FIGS. 27 and 28, the tolerance ring 10 consists of a ring body 11 having a spring behavior and being shaped in a hollow cylinder shape with a gap between both edges in a circumferential direction. The ring body 11 has a plurality of protrusions 13 projecting outward in a radial direction and being placed at regular intervals in the circumferential direction. For example, the number of the protrusions 13 is twenty-eight in the circumferential direction and they are arranged in two lines in the axial direction. Since the lines of the protrusions 13 are symmetrically positioned about a plane vertical to the axis of the tolerance ring 10, one line will be described, while explanation of the other line will be omitted. The tolerance ring 10 that is developed in a plate shape (i.e., intermediate product before forming in a cylinder shape) is referred to as protrusions-provided plate 10A (see FIGS. 29-31). The tolerance ring 10 is made by bending the protrusions-provided plate 10A in a cylinder shape. The tolerance ring 10 is preferably made of metal materials, and may be made of resin materials.

The protrusions 13 have the same configuration and are placed regularly and continuously in the circumferential direction. Each of the protrusions 13 is formed in a hipped roof shape (see FIG. 27) having a triangular cross-section (see FIG. 30), a predetermined length 13L in the axial direction (see FIGS. 29 and 31), a predetermined width 13W in the peripheral direction (see FIGS. 29 and 30), and a predetermined height 13H projecting in the radial direction (see FIGS. 30 and 31). That is, each of the protrusions 13 consists of two triangular slopes and two trapezoidal slopes such that upper sides of the trapezoidal slopes together form a ridge line 13a and lower sides of four slopes together form a rectangle. Each of the protrusions 13 is symmetrically formed in a longitudinal direction (vertical direction in FIG. 29) and a width direction (horizontal direction in FIG. 29). In the ring body 11, in areas other than the protrusions 13, i.e., an axially central area 14, axially end areas 15 and peripherally edge areas 16 (see FIG. 29) are positioned on the same cylinder surface (see FIG. 27). The opposed edge areas 16 together form a gap 12 therebetween (FIG. 27). In each edge area 16, a portion between the protrusion 13 and the gap 12 is referred to as edge portion 16a.

As shown in FIG. 26, the tolerance ring 10 is fitted between the axial members S1 and S2 of the torque transmission device T. In this operation, the ring body 11 is expanded to be closely-attached to the outer peripheral surface S1a of the inner axial member S1. Accordingly, the width of the gap 12 of the attached ring body 11 is wider than that of the gap 12 of the non-attached ring body 11 (see FIG. 28). The ridge line 13a of each protrusion 13 elastically contacts with the inner peripheral surface S2a of the outer axial member S2.

In the tolerance ring 10, a pair of edge areas 16 adjacent to the gap 12 (right-left pair in FIG. 28) of the ring body 11 is in a cantilever spring state, respectively. Thus, the edge portions 16a between the gap 12 and each of the protrusions 13 close to the gap 12 (see FIG. 27) have low rigidity and can be easily deformed. As a result, the protrusions 13 near the gap 12 (corresponding to about one to three protrusion(s) 13 in each edge area 16) are likely to decrease their rigidities. In a situation where such a tolerance ring 10 is used in the torque transmission device T (see FIG. 26), there is a fear that the protrusions 13 near the gap 12 could easily collapse, so that the axial members S1 and S2 become eccentric. That is, in FIG. 26, when the axis of the outer axial member S2 moves downwardly relative to the axis of the inner axial member S1, a space between the axial members S1 and S2 becomes narrow near the gap 12 (upper end in FIG. 26), while another space between the axial members S1 and S2 at an area opposing to the gap 12 in the radial direction (lower end in FIG. 26) becomes broad. In this way, eccentricity between the axial members S1 and S2 is undesirable since it causes an increase in slip torque in one area in the circumferential direction and causes a decrease in slip torque in another area, and thus makes surface pressure remarkably unevenness and leads to positional displacement of the inner axial member S1 and/or the outer axial member S2.

Accordingly, there has been need for tolerance rings for torque transmission devices, which can prevent eccentricity between the axial members of the torque transmission devices.

BRIEF SUMMARY OF THE INVENTION

One aspect of this disclosure is a torque transmitting tolerance ring having a ring body that is made of an elastic plate and is formed in a substantially hollow cylinder shape having a pair of edges extending in an axial direction. The ring body has a plurality of protrusions radially projecting and being aligned along a peripheral direction. It may have a first region having some of the protrusions including a pair of the protrusions adjacent to the pair of the edges. It may have a second region being positioned on an opposite side to the first region in a diametrical direction and having some of the protrusions. Preferably the pair of the protrusions have equal rigidity to one of the protrusions in the second region.

In accordance with the aspect, since rigidities of the protrusions balance in the diametrical direction through a gap formed between the pair of the edges, collapse of the pair of the protrusions can be prevented so that it is able to prevent eccentricity between the axial members of the torque transmission device.

DETAILED DESCRIPTION OF THE INVENTION

Each embodiment will be described in reference to drawings hereafter. Because the tolerance ring of each embodiment is based on the conventional example (see FIGS. 26-31) and is provided with some changes, such changes will be described, while overlapping explanations will be omitted. For convenience of explanation, the protrusion 13 is used as a basic shape, so the protrusion 13 is referred to as "standard protrusion 13".

Figure 1:
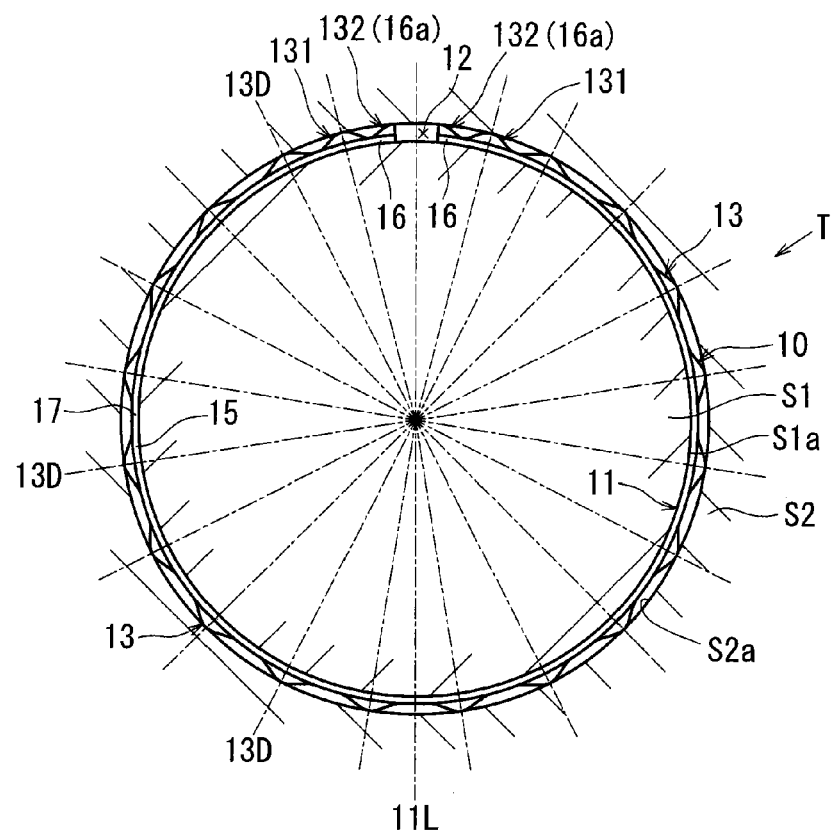
FIG. 1 is a cross-sectional view showing a torque transmission device of a first embodiment.
Figure 2:
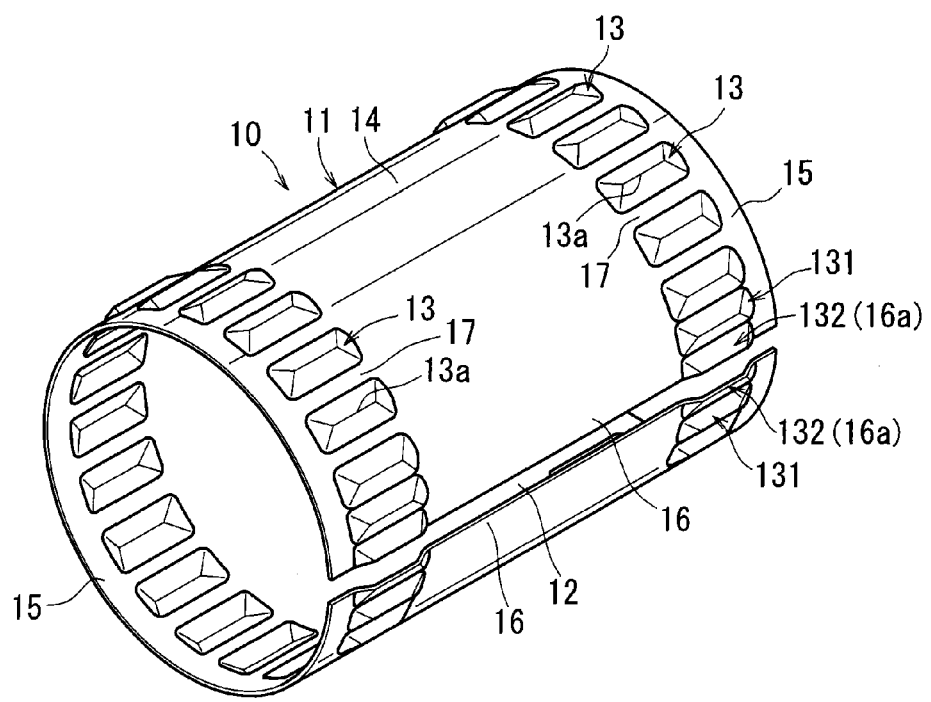
FIG. 2 is a perspective view of a tolerance ring.
Figure 3:
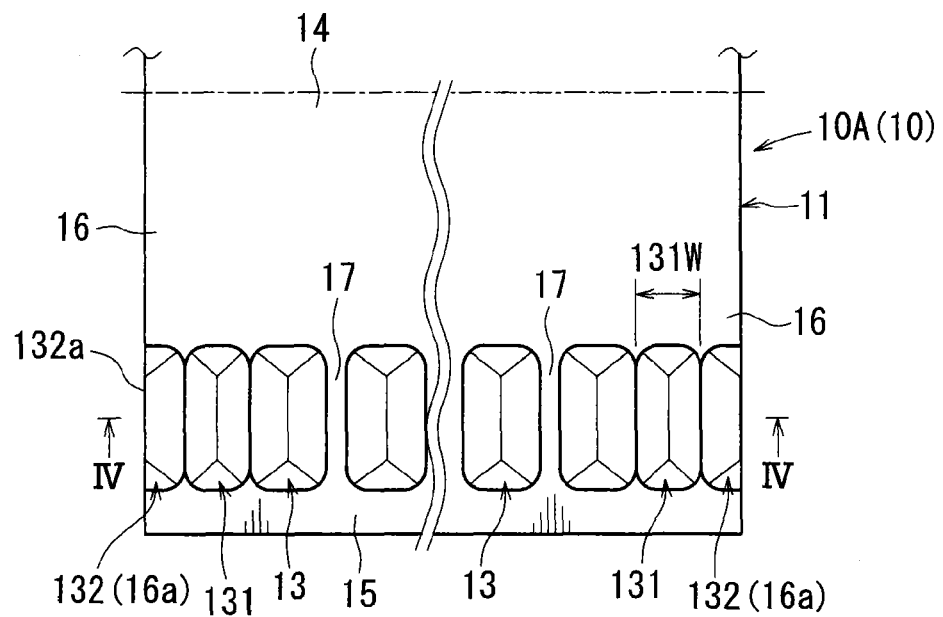
FIG. 3 is a top view of a developed tolerance ring.
Figure 4:
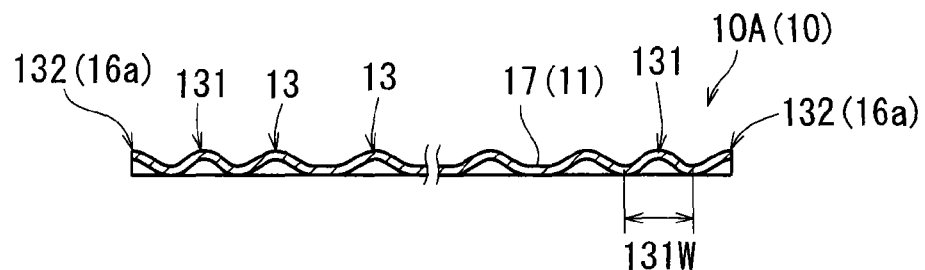
FIG. 4 is a cross-sectional view along line IV-IV in FIG. 3.

A first embodiment will be described. FIG. 1 is a cross-sectional view showing a torque transmission device. FIG. 2 is a perspective view of the tolerance ring. FIG. 3 is a top view of the developed same tolerance ring. FIG. 4 is a cross-sectional view along line IV-IV in FIG. 3.

With respect to a tolerance ring 10 used for a torque transmission device of this embodiment, one and a half of reinforced protrusions 131 and 132 are formed at each edge area 16 of the ring body 11 symmetrically about the gap 12. The reinforced protrusion 131 has a narrower width 131W (see FIGS. 3 and 4) than the width 13W of the standard protrusions 13 (see FIGS. 29 and 30). Because of this configuration, rigidities of the reinforced protrusions 131 are higher than those of the standard protrusions 13. In addition, the reinforced protrusions 131 each have the same length 13L with the length 13L of the standard protrusions 13 (see FIGS. 29 and 31). Moreover, the reinforced protrusions 131 each have the same height 13H with the height 13H of the standard protrusions 13 (see FIGS. 30 and 31). Each of the reinforced protrusions 131 is continuously formed with the standard protrusion 13, which is adjacent to the reinforced protrusion 131, and the reinforced protrusion 132 (see FIGS. 3 and 4). Here, the reinforced protrusions 132 make rigidities of the edge portions 16a higher, and thus are referred to as edge reinforcing portions 132.

Each of the edge reinforcing portions 132 is formed to be a half of the reinforced protrusion 131 in the width direction (horizontal direction in FIG. 3), and is placed at the edge portion 16a adjacent to the reinforced protrusion 131 in each edge area 16. A ridge line 132a of the each edge reinforcing portion 132 (see FIG. 3) is positioned at an edge of the each edge area 16 in the circumferential direction. Formation of the edge reinforcing portions 132 makes the edge portions 16a (including the edge reinforcing portions 132) near the gap 12 of the ring body 11 concave-convex shape in the axial direction (vertical direction in FIG. 3) thereby increasing rigidities of them. Accordingly, rigidities of the pair of the reinforced protrusions 131 are increased.

The number of the standard protrusions 13 is reduced from twenty-eight of the conventional art (see FIG. 28) to eighteen. Between standard protrusions 13 close to each other, circumferentially even areas 17 (see FIGS. 2 and 3) are formed to be positioned on the same cylinder surface with the axially central area 14 and the both end areas 15 of the ring body 11. In a situation where the tolerance ring 10 is fitted between the axial members S1 and S2 of the torque transmission device T (see FIG. 1), which is referred to as "fitted state", the eighteen standard protrusions 13 are arranged at regular intervals in the circumferential direction of the ring body 11 and opposed to one another in the radial direction of the ring body 11 (are positioned on a line 13D extending in the diametrical direction). In a cross-sectional view vertical to the axis of the ring body 11, the standard protrusions 13 are positioned in a symmetric manner about a line 11L diametrically extending through a center of the gap 12 of the ring body 11 (bilaterally symmetric in FIG. 1).

Due to increase in the rigidities of the reinforced protrusions 131 of the ring body 11 and increase in the rigidities of the edge portions 16a near the gap 12, it is configured that the rigidity of the each reinforced protrusion 131 is equal to the rigidity of the standard protrusion 13 positioned at a half radially opposed to the gap 12 (lower half in FIG. 1) of the ring body 11.

In accordance with the above-mentioned tolerance ring 10, it is configured that each rigidity of the pair of the reinforced protrusions 131 of the ring body 11 is equal to the rigidity of the standard protrusion 13 placed at the half diametrically opposed to the gap 12 of the ring 11. Accordingly, the rigidities of the protrusions (the standard protrusion 13 and the reinforced protrusion 131) balance in the diametrical direction extending through the gap 12 of the tolerance ring 10 (vertical direction in FIG. 1), so it is able to prevent collapse of the pair of the reinforced protrusions 131, and thus to prevent eccentric between the axial members S1 and S2 of the torque transmission device. Thus, it is able to prevent unevenness of surface pressure in the circumferential direction caused by the eccentric between the axial members S1 and S2. It is further able to inhibit positional displacement of the inner axial member S1 and/or the outer axial member S2.

In addition to increase in the rigidities of the pair of the reinforced protrusions 131 of the ring body 11, the edge portions 132 may be formed at the edge portions 16a adjacent to the pair of the reinforced protrusions 131. This can increase the rigidities of the pair of the reinforced protrusions 131. Thus, the rigidities of the pair of the reinforced protrusions 131 of the ring body 11 can be increased by reinforcement themselves and increase in the rigidities of the edge portions 16a. Here, a plurality of the reinforced protrusions 131 may be formed at each edge area 16. Each of the edge reinforcing portions 132 is not limited to a shape corresponding to a half of the reinforced protrusion 131. They may be formed in any shape providing at least one radially concave or convex at the edge portion 16a near the gap 12.

In the fitted state of the tolerance ring 10 in the torque transmission device T (see FIG. 1), the standard protrusions 13 are arranged at regular intervals in the circumferential direction of the ring body 11. They may be arranged in an opposing manner to each other in the diametrical direction of the ring body 11 (in a manner positioned on the line 13D extending in the diametrical direction). Hence, it is easy to balance the rigidities of the standard protrusions 13.

Figure 5:
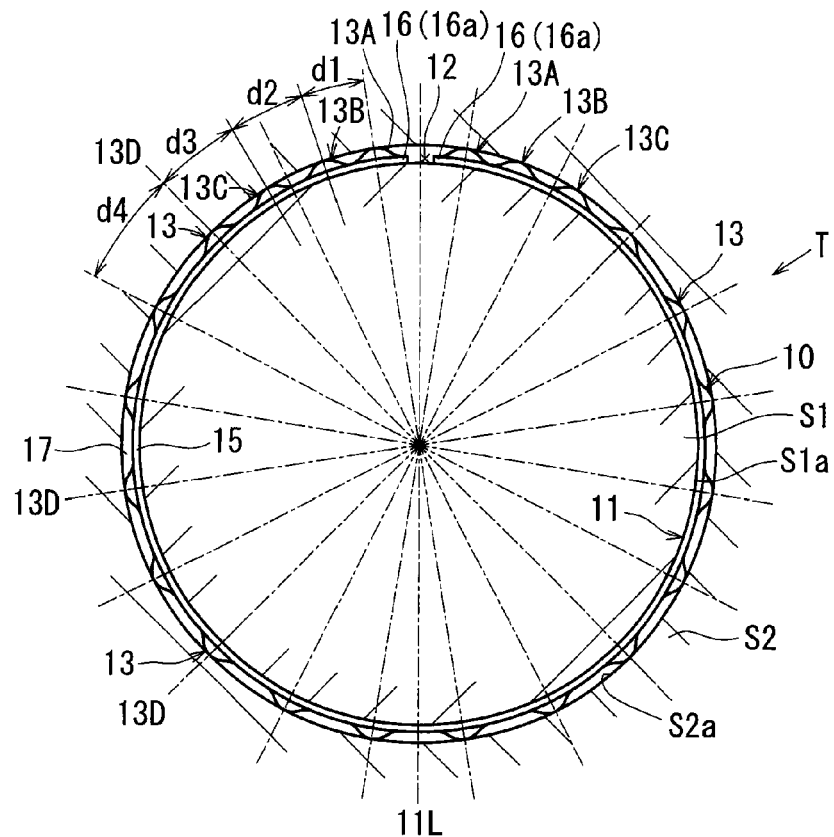
FIG. 5 is a cross-sectional view of the torque transmission device of a second embodiment.

A second embodiment will be described. This embodiment corresponds to the first embodiment with some changes. FIG. 5 is a cross-sectional view of the torque transmission device.

As shown in FIG. 5, in the tolerance ring 10 of this embodiment, the reinforced protrusions 131 and the edge reinforcing portions 132 of the first embodiment (see FIG. 1) are omitted, while each three reinforced protrusions 13A, 13B and 13C are formed near the gap 12 of the ring body 11. The reinforced protrusions 13A, 13B and 13C are formed in the same shape with the standard protrusion 13 and are aligned along the circumferential direction from a gap 12 side toward the standard protrusion 13 side. On the ring body 11, the axially central area 14, the axially end areas 15 and the peripherally edge areas 16 (including edge portions 16a) are formed to be positioned on the same cylinder surface like in the conventional art (see FIG. 26).

The reinforced protrusions 13A, 13B and 13C are placed such that intervals therebetween gradually become narrow from the standard protrusion 13 side toward the gap 12 side.

In particular, a distance between the reinforced protrusions 13A and 13B is referred to as d1, a distance between the reinforced protrusions 13B and 13C is referred to as d2, a distance between the reinforced protrusions 13C and the standard protrusion 13 is referred to as d3, and a distance between the standard protrusions 13 is referred to as d4. The distances d1, d2 and d3 are determined to satisfy the relationship as d1<d2<d3<d4. Because of this configuration, the rigidities of the reinforced protrusions 13A, 13B and 13C near the gap 12 of the ring body 11 are increased.

The reinforced protrusions 13A, 13B and 13C may be configured by at least two of them adjacent to each other. The standard protrusions 13 placed at the half diametrically opposed to the gap 12 of the ring body 11 may be positioned such that, for example, intervals between each three standard protrusions 13, which are positioned at each sides of the line 11L diametrically extending through the center of the gap 12 of the ring body 11, gradually become wider toward the line 11L in order to decrease in rigidities of the standard protrusions placed at the half diametrically opposed to the gap 12 of the ring body 11. In this case, it is able to increase in rigidities of the pair of the protrusions 13 near the gap 12 of the ring body 11 relative to the standard protrusions 13 placed at the half diametrically opposed to the gap 12.

Figure 6:
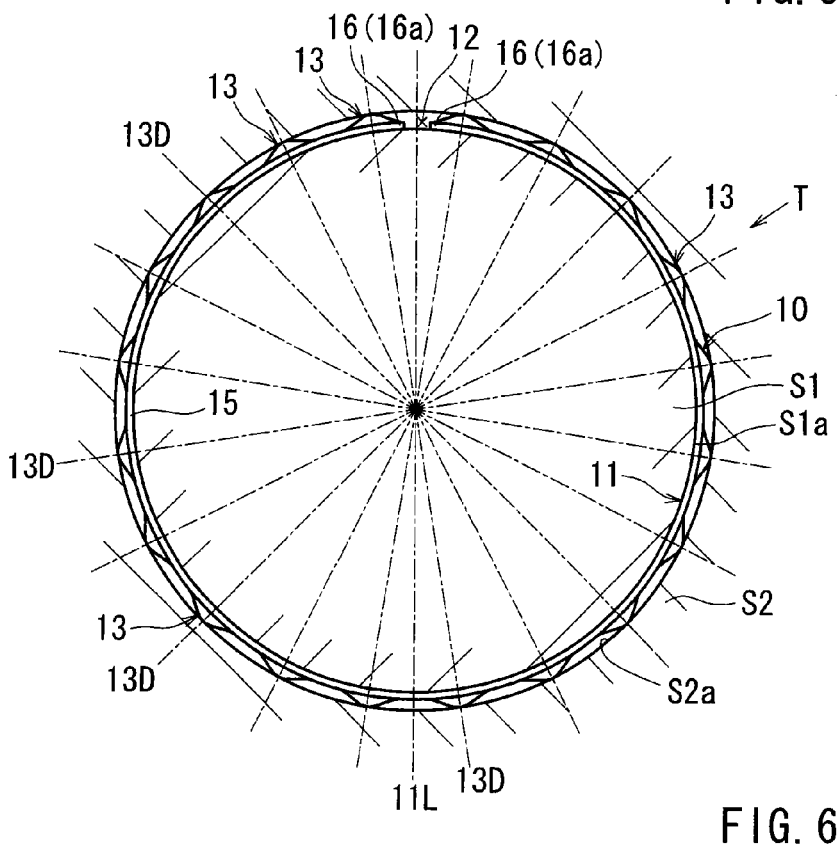
FIG. 6 is a cross-sectional view of the torque transmission device of a third embodiment.

A third embodiment will be described. This embodiment corresponds to the first embodiment with some changes. FIG. 6 is a cross-sectional view of the torque transmission device.

As shown in FIG. 6, in the tolerance ring 10 of this embodiment, the reinforced protrusions 131 and the edge reinforcing portions 132 of the first embodiment (see FIG. 1) are omitted, while two of the standard protrusions 13 are added such that total twenty standard protrusions 13 are formed. The twenty standard protrusions 13 are placed at regular intervals in the circumferential direction. The rigidities of the pair of the standard protrusions 13 close to the gap 12 of the ring body 11 are increased by surface treatment such as shot peening treatment or heat treatment.

In accordance with this embodiment, since the total twenty standard protrusions 13 are placed at regular intervals in the circumferential direction, it is able to easily balance rigidities of the standard protrusions 13 over the entire circumference of the tolerance ring 10. In this embodiment, at the edge areas 16 near the gap 12 of the ring body 11, the standard protrusions 13 near the gap 12 are formed overlapping the edge portions 16a. Meanwhile, the standard protrusions 13 may be placed adjacent to the edge portions 16a in the same manner with the conventional art (see FIG. 26). The rigidities of the pair of the standard protrusions 13 near the gap 12 of the ring body 11 may be increased by the addition of reinforcing members, an increase in thickness or the like other than surface treatment.

Figure 7:
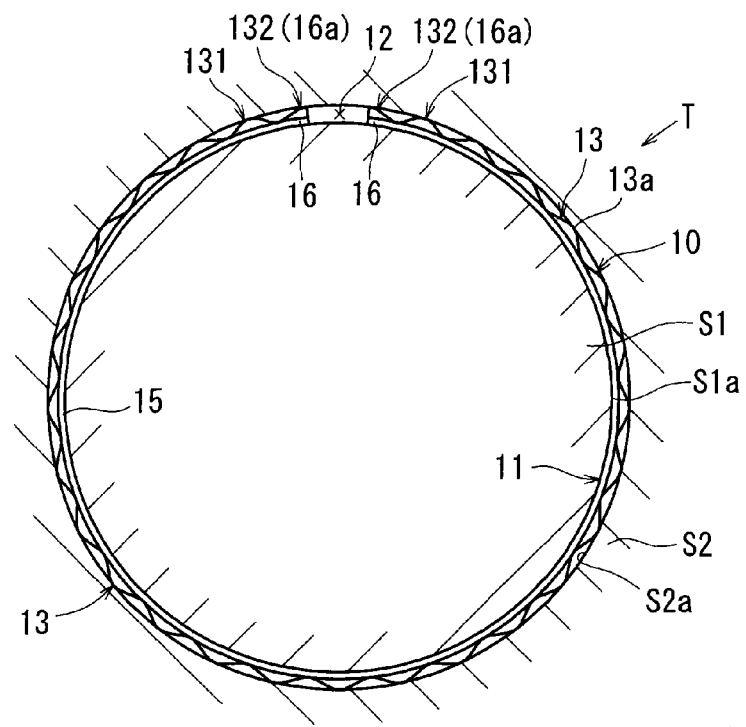
FIG. 7 is a cross-sectional view of the torque transmission device of a fourth embodiment.
Figure 8:
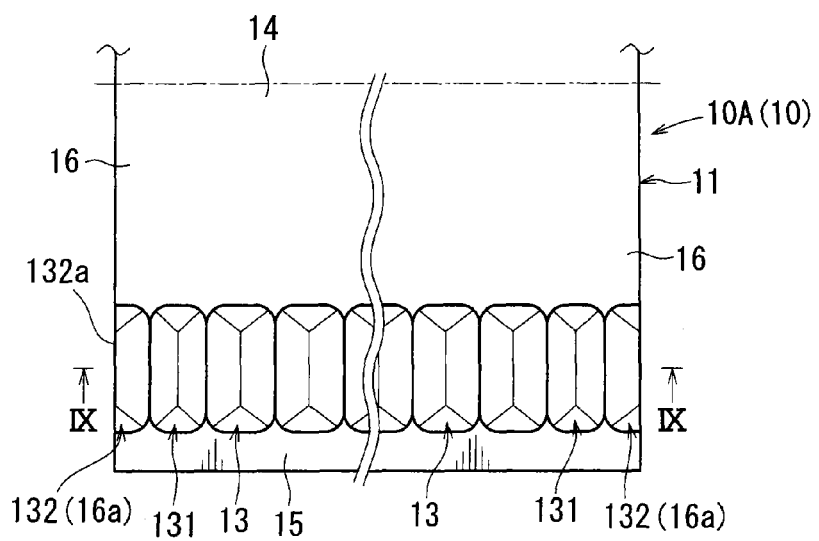
FIG. 8 is a top view of the developed tolerance ring.
Figure 9:
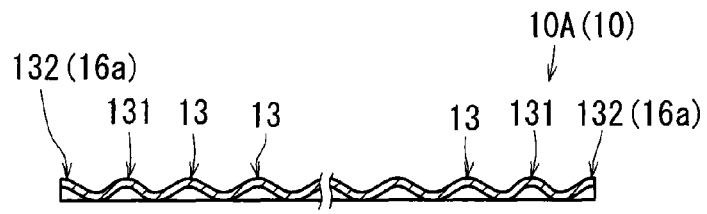
FIG. 9 is a cross-sectional view along line IX-IX in FIG. 8.

A fourth embodiment will be described. This embodiment corresponds to the conventional art with some changes. FIG. 7 is a cross-sectional view of the torque transmission device. FIG. 8 is a top view of the developed same tolerance ring 10. FIG. 9 is a cross-sectional view along line IX-IX in FIG. 8.

As shown in FIGS. 7-9, the tolerance ring 10 of this embodiment certain features are formed in a similar manner as the first embodiment (see FIGS. 1-4). At the pair of the edge areas 16 near the gap 12 of the ring body 11 of the conventional art (see FIGS. 28-30) the reinforced protrusions 131 and the edge reinforcing portions 132 are formed symmetrically about the gap 12. The number of the standard protrusions is reduced from twenty-eight in the conventional art (see FIG. 28) to twenty-five. The twenty-five standard protrusions 13 are arranged regularly and continuously in a circumferential direction in the same way as the conventional art (see FIGS. 29 and 30).

Figure 10:
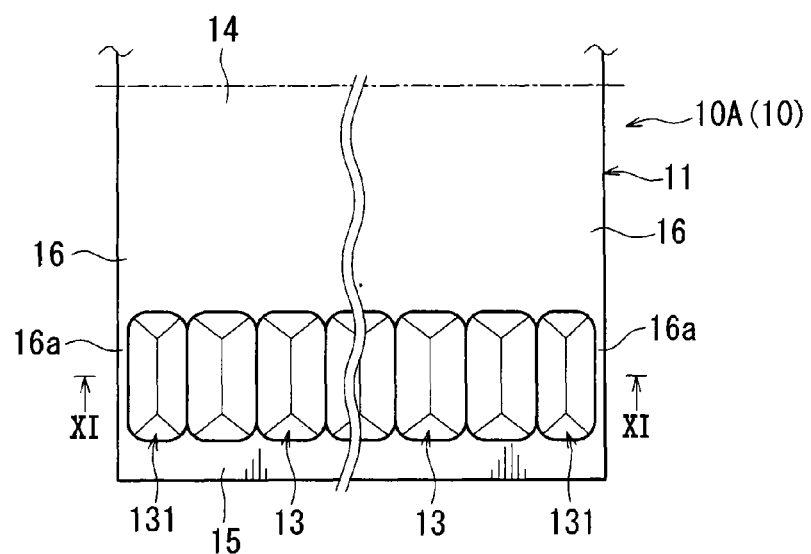
FIG. 10 is a top view of the developed tolerance ring of a fifth embodiment.
Figure 11:
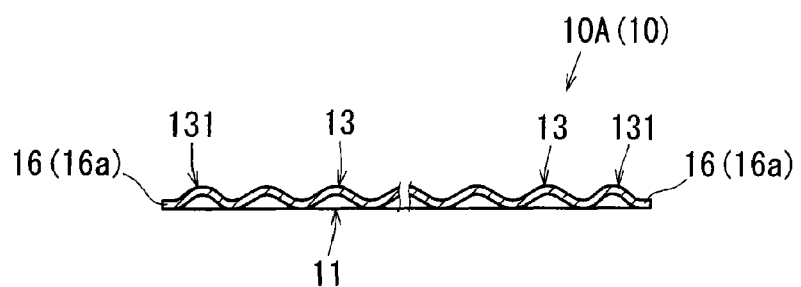
FIG. 11 is a cross-sectional view along line XI-XI in FIG. 10.

A fifth embodiment will be described. This embodiment corresponds to the fourth embodiment with some changes. FIG. 10 is a top view of the developed tolerance ring. FIG. 11 is a cross-sectional view along line XI-XI in FIG. 10.

As shown in FIGS. 10 and 11, in the tolerance ring 10 of this embodiment, the edge reinforcing portions 132 of the fourth embodiment (see FIGS. 7-9) are omitted. As a result, the edge portions 16a are positioned on the same cylinder surface with the axially central area 14. Also, the end areas 15 are formed at edge areas 16 close to the gap 12 of the ring body 11 in the same manner as the conventional art (see FIGS. 29 and 30).

Figure 12:
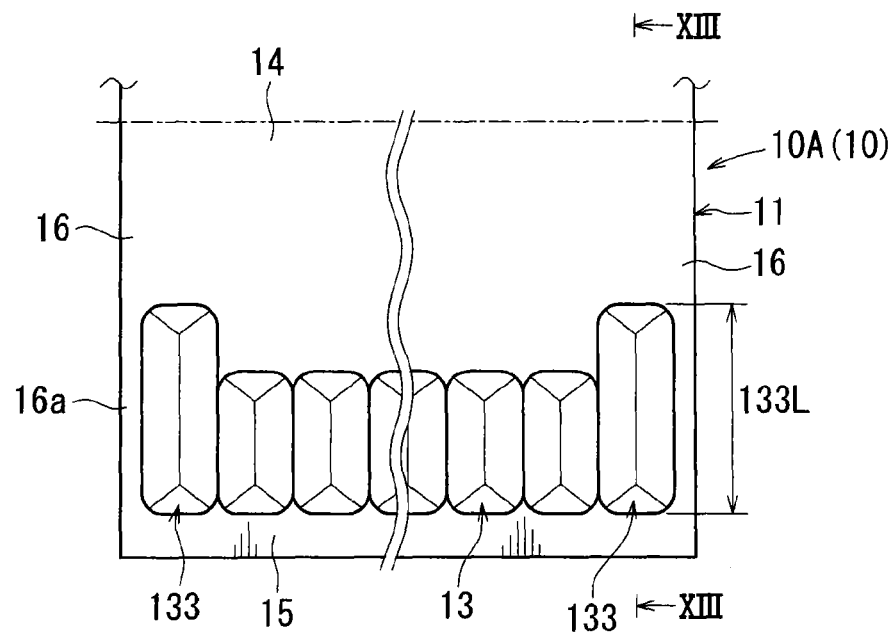
FIG. 12 is a top view of the developed tolerance ring of a sixth embodiment.
Figure 13:
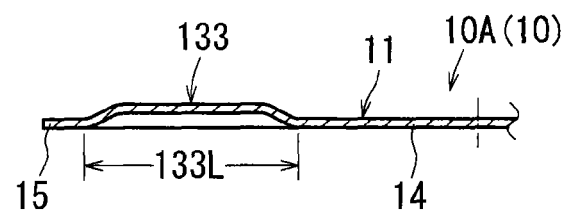
FIG. 13 is a cross-sectional view along line XIII-XIII in FIG. 12.

A sixth embodiment will be described. This embodiment corresponds to the conventional art with some changes. FIG. 12 is a top view of the developed tolerance ring. FIG. 13 is a cross-sectional view along line XIII-XIII in FIG. 12.

As shown in FIGS. 12 and 13, in the tolerance ring 10 of this embodiment, the pair of the standard protrusions 13 close to the gap 12 of the conventional art (see FIGS. 26-31) are replaced with reinforced protrusions 133. The reinforced protrusions 133 each have length 133L longer than length 13L of the standard protrusions 13 (see FIGS. 29 and 31). Due to this configuration, rigidities of the reinforced protrusions 133 are increased compared to the rigidities of the standard protrusions 13. The reinforced protrusions 133 are formed to have the width 13W same with the width 13W of the standard protrusions 13 (see FIGS. 29 and 30). The reinforced protrusions 133 are formed to have the same height 13H as the height 13H of the standard protrusions 13 (see FIGS. 30 and 31).

Figure 14:
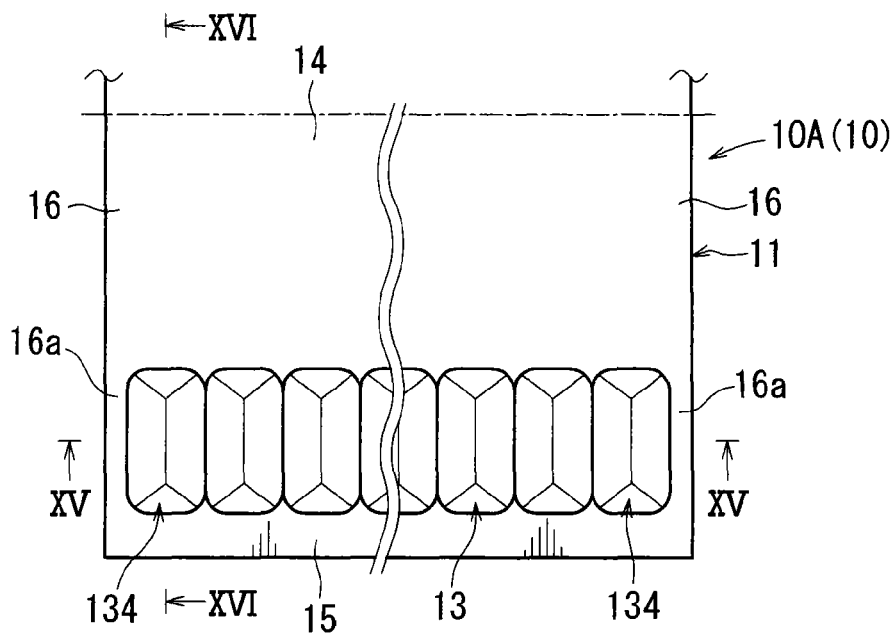
FIG. 14 is a top view of the developed tolerance ring of a seventh embodiment.
Figure 15:
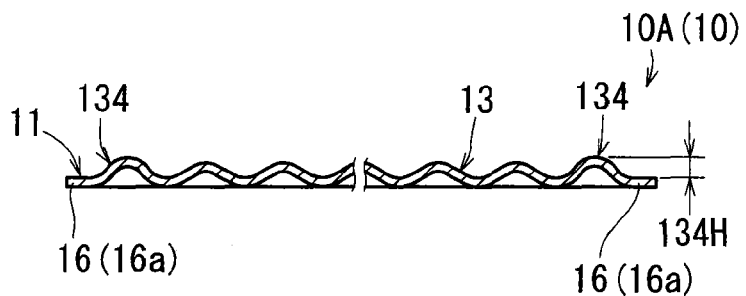
FIG. 15 is a cross-sectional view along line XV-XV in FIG. 14.
Figure 16:
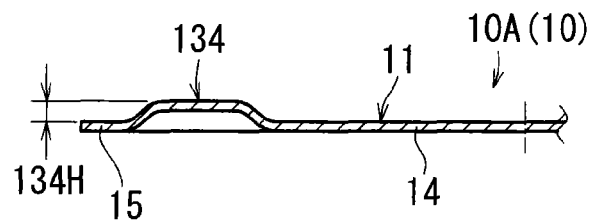
FIG. 16 is a cross-sectional view along line XVI-XVI in FIG. 14.

A seventh embodiment will be described. This embodiment corresponds to the conventional art with some changes. FIG. 14 is a top view of the developed tolerance ring. FIG. 15 is a cross-sectional view along line XV-XV in FIG. 14. FIG. 16 is a cross-sectional view along line XVI-XVI in FIG. 14.

As shown in FIGS. 14-16, in the tolerance ring 10 of this embodiment, the pair of the standard protrusion 13 close to the gap 12 of the conventional art (see FIGS. 26-31) are replaced with reinforced protrusions 134. The reinforced protrusions 134 each have a height 134H (see FIGS. 15 and 16) that is higher than the height 13H of the standard protrusions 13 (see FIGS. 30 and 31). This makes rigidities of the reinforced protrusions 134 high compared with the rigidities of the standard protrusions 13. The reinforced protrusions 134 are shaped to have the same length 13L as the length 13L of the standard protrusions 13 (see FIGS. 29 and 31). The reinforced protrusions 134 are shaped to have the same width 13W as the width 13W of the standard protrusions 13 (see FIGS. 29 and 30).

Figure 17:
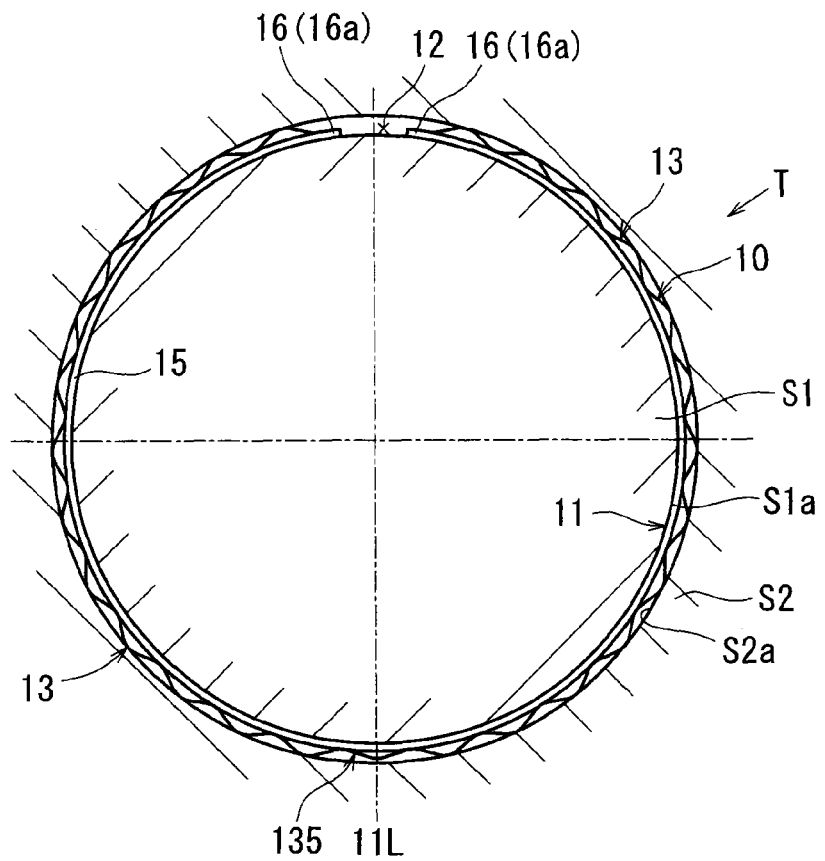
FIG. 17 is a cross-sectional view of the torque transmission device of an eighth embodiment.
Figure 18:
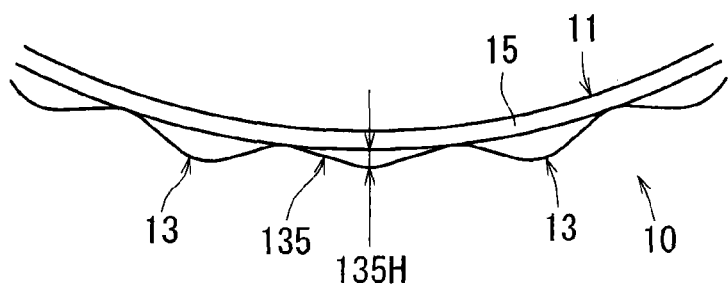
FIG. 18 is a side view showing a significant portion of the tolerance ring.

An eighth embodiment will be described. This embodiment corresponds to the conventional art with some changes. FIG. 17 is a cross-sectional view of the torque transmission device. FIG. 18 is a side view of a part of the tolerance ring.

As shown in FIGS. 17 and 18, in the tolerance ring 10 of this embodiment, the standard protrusion 13 positioned diametrically opposed to the gap 12 is replaced with a weakened protrusion 135. The weakened protrusion 135 has a height 135H (see FIG. 18) lower than the height 13H of the standard protrusions 13 (see FIGS. 30 and 31). This makes the rigidity of the weakened protrusion 135 lower as compared to the rigidity of the standard protrusions 13. Accordingly, in this embodiment, it is able to increase in the rigidities of the pair of the protrusions 13 close to the gap 12 of the ring body 11 relative to the rigidity of the weakened protrusion 135. The weakened protrusion 135 is shaped to have the same length 13L as the length 13L of the standard protrusions 13 (see FIGS. 29 and 31). The weakened protrusion 135 is shaped to have the same width 13W as the width 13W of the standard protrusions 13 (see FIGS. 29 and 30).

The total number including the weakened protrusion 135 and the standard protrusions 13 is set to twenty-seven such that the weakened protrusion 135 is positioned diametrically opposed to the gap 12 (positional relationship on the line 11L extending in the diametrical direction). The twenty-six standard protrusions 13 are placed symmetrically about the line 11L diametrically extending through the center of the gap 12 of the ring body 11 (in a right-left symmetric manner in FIG. 17).

Figure 19:
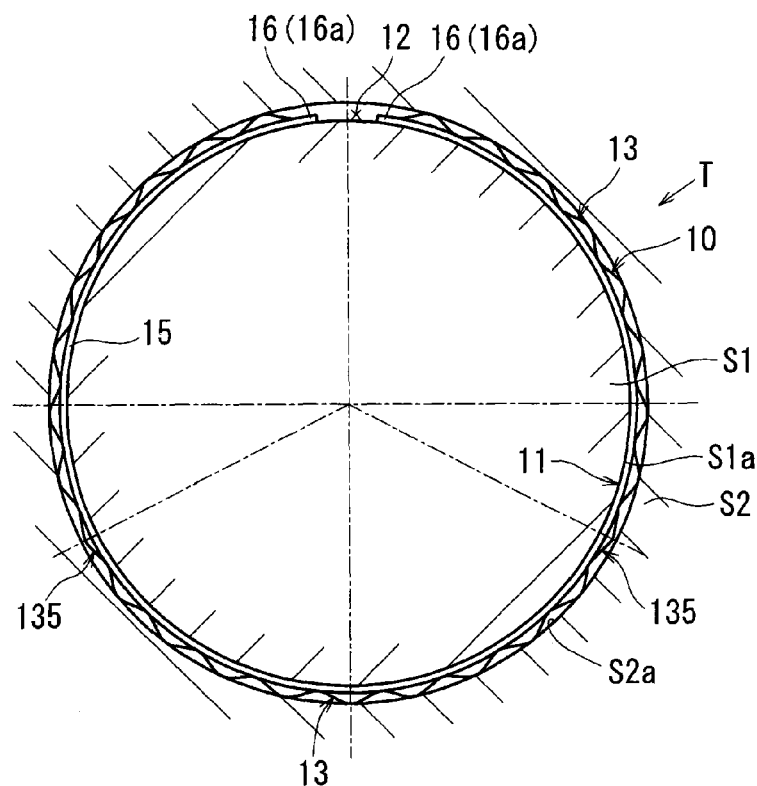
FIG. 19 is a cross-sectional view of the torque transmission device of a ninth embodiment.

A ninth embodiment will be described. This embodiment corresponds to the conventional art with some changes. FIG. 19 is a cross-sectional view of the torque transmission device.

As shown in FIGS. 17 and 18, in the tolerance ring 10 of this embodiment, the weakened protrusion 135 positioned diametrically opposed to the gap 12 of the ring body 11 of the eighth embodiment (see FIGS. 17 and 18) is replaced with a standard protrusion 13. Meanwhile with respect to the standard protrusions 13, they are placed halfway diametrically opposed to the gap 12 (lower half in FIG. 19), for example, a pair of the standard protrusions 13, which are ninth from the gap 12 side (one pair in FIG. 19), is replaced with weakened protrusions 135. The weakened protrusions 135 are formed in the same shape with those of the eighth embodiment. It is only necessary to place the weakened protrusions 135 halfway diametrically opposed to the gap 12 (lower half in FIG. 19) in a symmetric manner about the line 11L (right-left symmetric manner in FIG. 19). In this way, one or more of the weakened protrusions 135 may be used instead of one or more of the standard protrusions 13. These are located seventh to twelfth from the gap 12 side.

Figure 20:
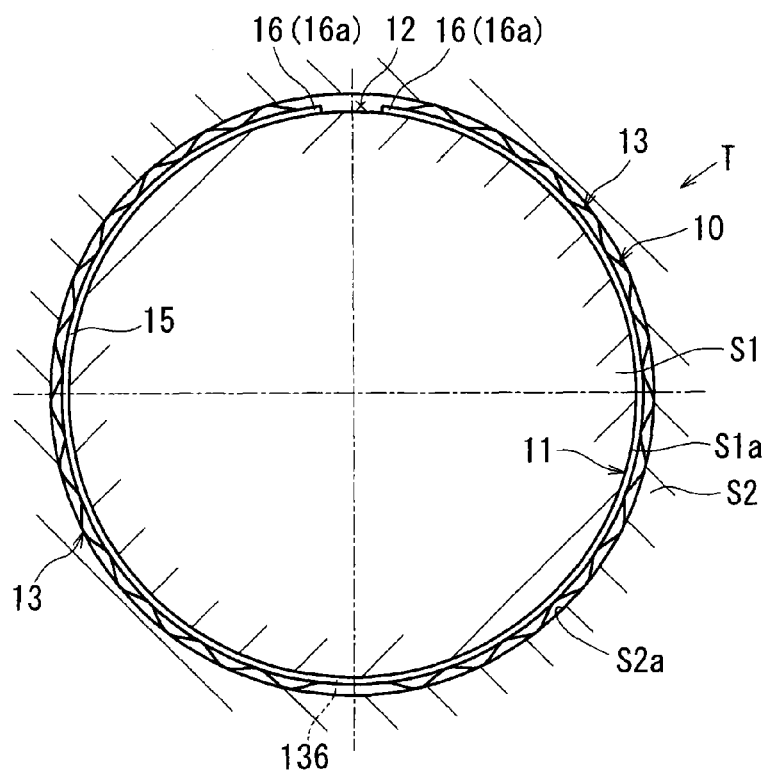
FIG. 20 is a cross-sectional view of the torque transmission device of a tenth embodiment.

A tenth embodiment will be described. This embodiment corresponds to the eighth embodiment with some changes. FIG. 20 is a cross-sectional view of the torque transmission device.

As shown in FIG. 20, in the tolerance ring 10 of this embodiment, the weakened protrusion 135 of the eighth embodiment (see FIG. 17) is omitted. An area where the weakened protrusion 135 is omitted is shaped as an even area 136 positioned on the same cylinder surface with the end areas 15 and the edge areas 16 of the ring body 11. In this way, a distance between the adjacent standard protrusions 13 becomes wider at the even area 136.

Figure 21:
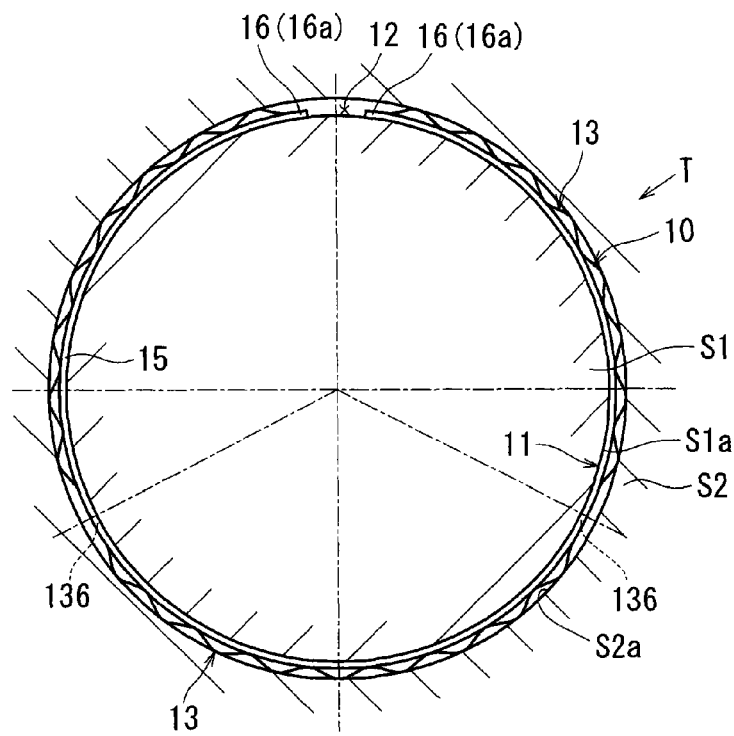
FIG. 21 is a cross-sectional view of the torque transmission device of an eleventh embodiment.

An eleventh embodiment will be described. This embodiment corresponds to the ninth embodiment with some changes. FIG. 21 is a cross-sectional view of the torque transmission device.

As shown in FIG. 21, in the tolerance ring 10 of this embodiment, the pair (right-left pair in FIG. 21) of the weakened protrusions 135 of the ninth embodiment (see FIG. 19) is omitted. Areas where the weakened protrusions 135 are omitted are shaped as even areas 136 positioned on the same cylinder surface with the end areas 15 and the edge areas 16 of the ring body 11 in a similar way to the tenth embodiment (FIG. 20), so that distances between the standard protrusions 13 become wider at each even area 136.

Figure 22:
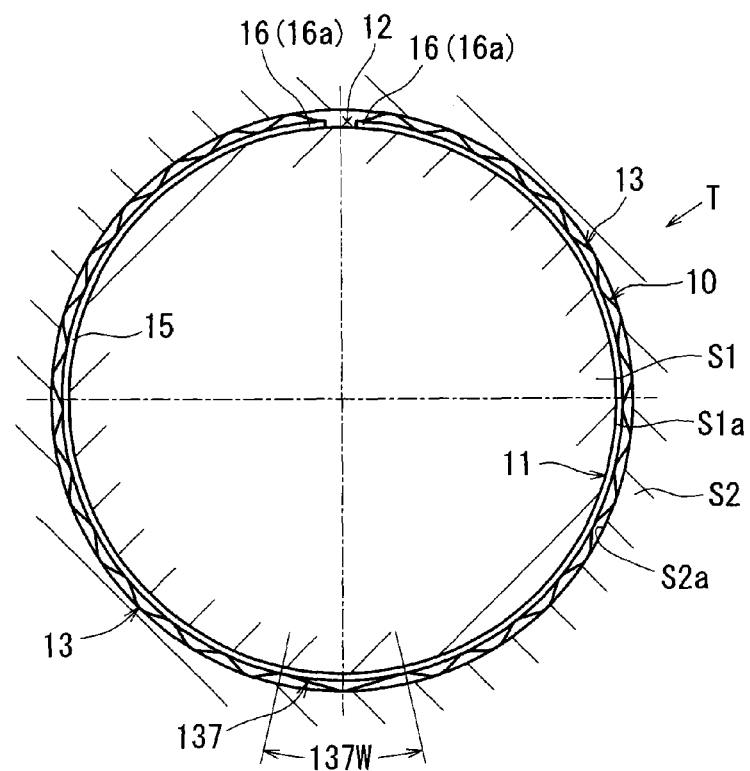
FIG. 22 is a cross-sectional view of the torque transmission device of a twelfth embodiment.

A twelfth embodiment will be described. This embodiment corresponds to the eighth embodiment with some changes. FIG. 22 is a cross-sectional view of the torque transmission device.

As shown in FIG. 22, in the tolerance ring 10 of this embodiment, the weakened protrusion 135 of the eighth embodiment (FIG. 17) is replaced with a wide weakened protrusion 137. The weakened protrusion 137 of this embodiment has a broader width 137W than the width 13W of the standard protrusions 13 (see FIGS. 29 and 30). This makes the rigidity of the weakened protrusion 137 lower as compared to the rigidities of the standard protrusions 13. The weakened protrusion 137 is shaped to have the same length 13L as the length 13L of the standard protrusions 13 (see FIGS. 29 and 31). The weakened protrusion 137 is shaped to have the same height 13H as the height 13H of the standard protrusions 13 (see FIGS. 30 and 31). Here, when the length 13L of the standard protrusions 13 is shortened, a rigidity of a formed weakened protrusion 137 can be low.

Figure 23:
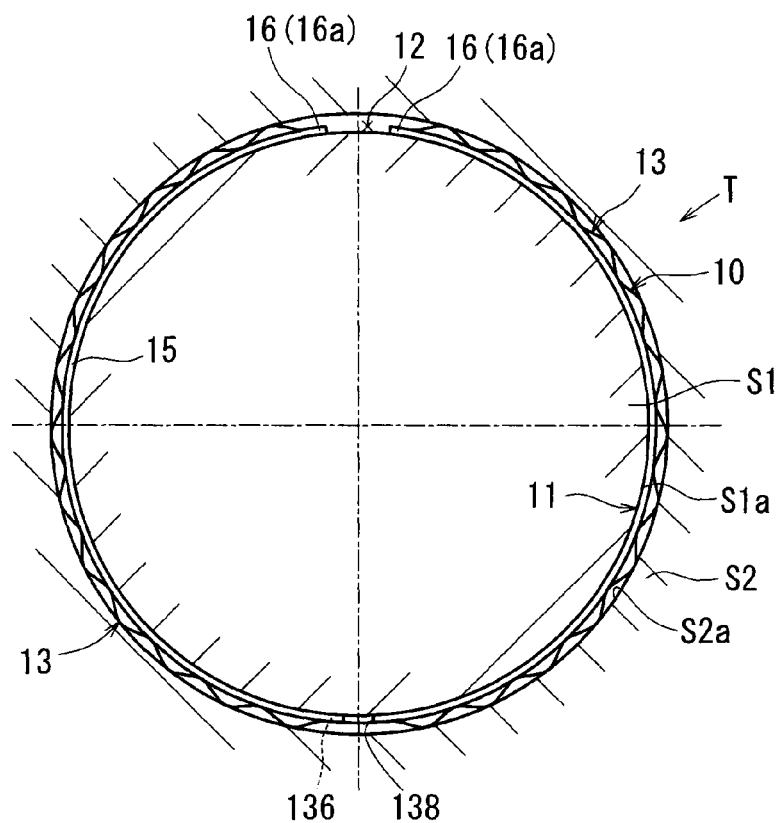
FIG. 23 is a cross-sectional view of the torque transmission device of a thirteenth embodiment.
Figure 24:
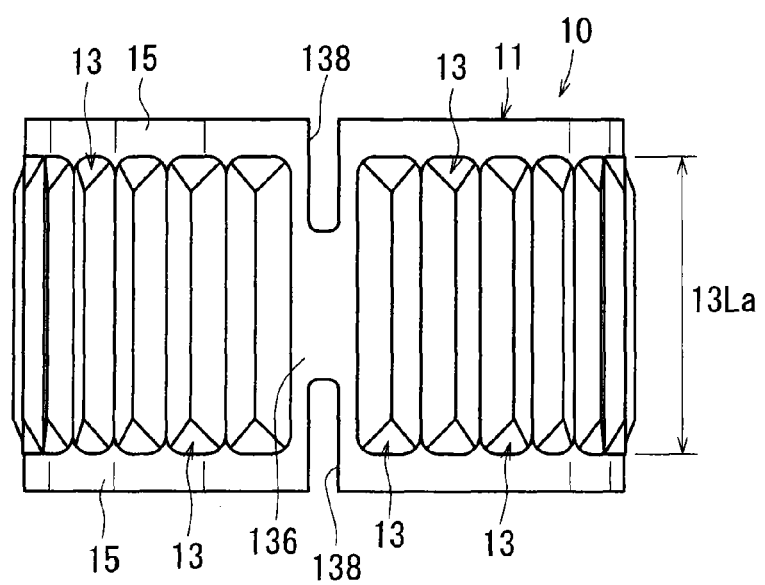
FIG. 24 is a bottom view of the tolerance ring.

A thirteenth embodiment will be described. This embodiment corresponds to the tenth embodiment with some changes. FIG. 23 is a cross-sectional view of the torque transmission device. FIG. 24 is a bottom view of the tolerance ring.

As shown in FIGS. 23 and 24, in the tolerance ring 10 of this embodiment, grooves 138 axially extending from axially end areas 15 toward a center area of the ring body 11 are formed at the even area 136 of the tenth embodiment (see FIG. 20). Due to this configuration, since the rigidity of the even area 136 decreases, the rigidities of the pair of the standard protrusions 13 positioned at each side of the grooves 138 become low. The grooves 138 may be shaped as hole. In this embodiment, the standard protrusions 13 are shaped to have longer length 13La in the axial direction (vertical direction in FIG. 24). Furthermore, a number of the standard protrusions 13 are arranged in one line in the circumferential direction.

Figure 25:
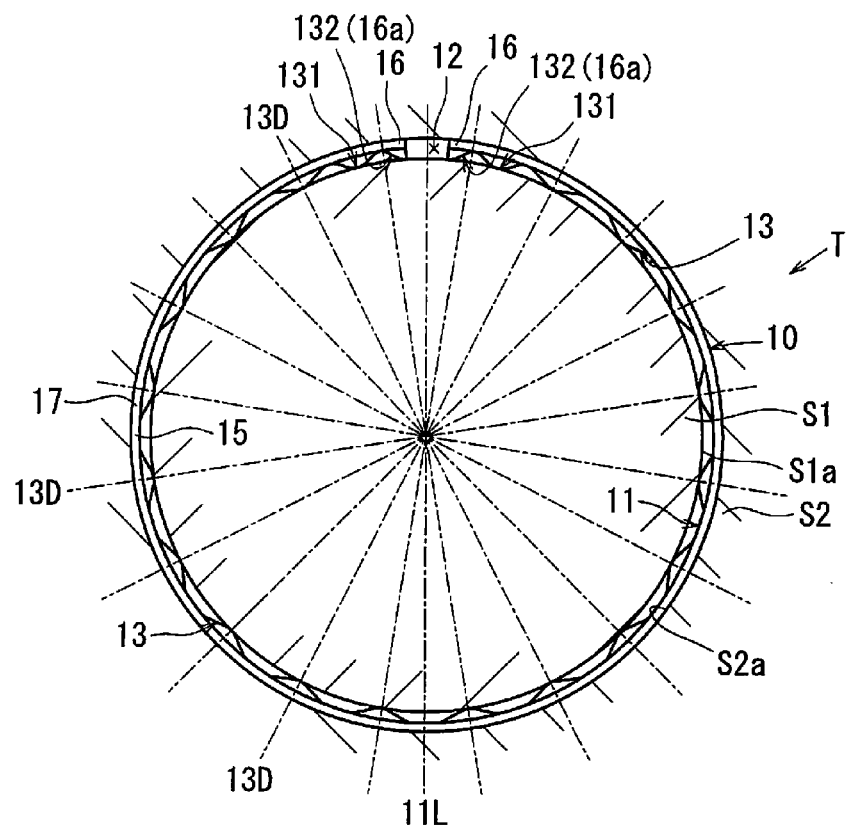
FIG. 25 is a cross-sectional view of a variant of the torque transmission device of the first embodiment.
Figure 26:
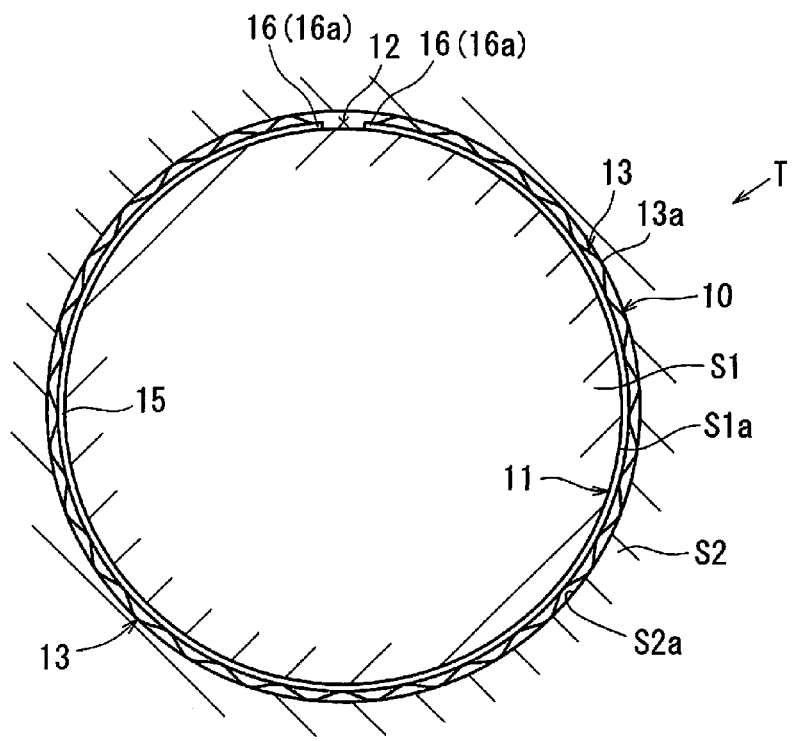
FIG. 26 is a cross-sectional view of a conventional torque transmission device.
Figure 27:
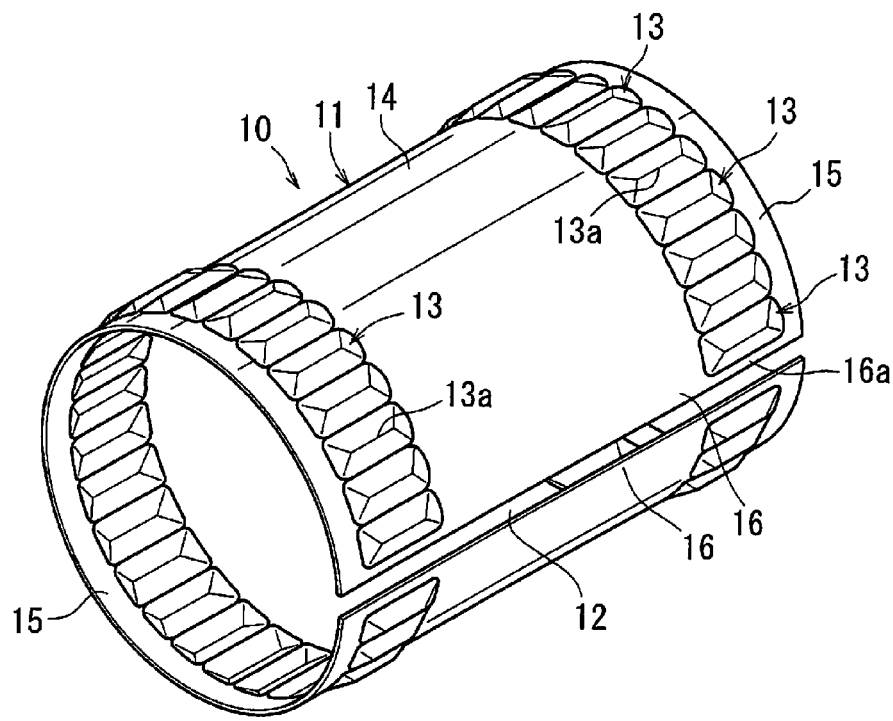
FIG. 27 is a perspective view of a tolerance ring.
Figure 28:
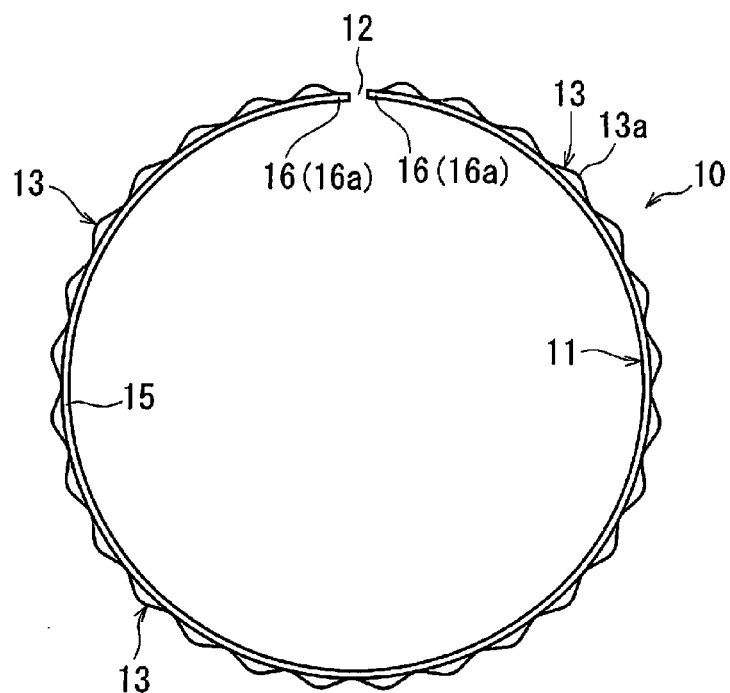
FIG. 28 is a side view of the tolerance ring in an axial direction.
Figure 29:
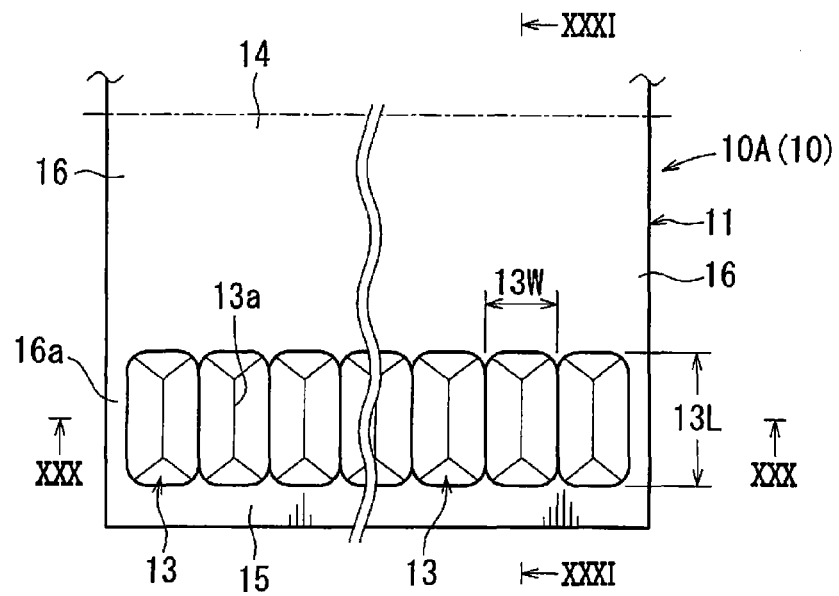
FIG. 29 is a top view of the developed tolerance ring.
Figure 30:
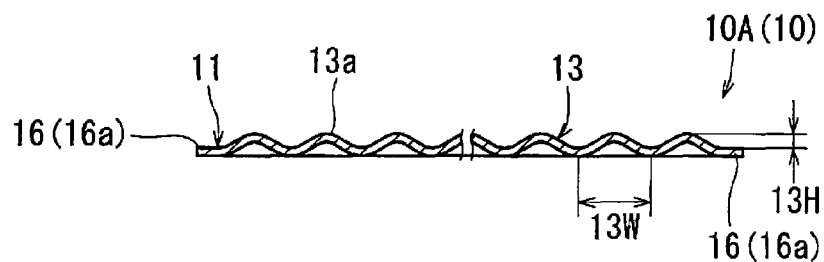
FIG. 30 is a cross-sectional view along line XXX-XXX in FIG. 29.
Figure 31:
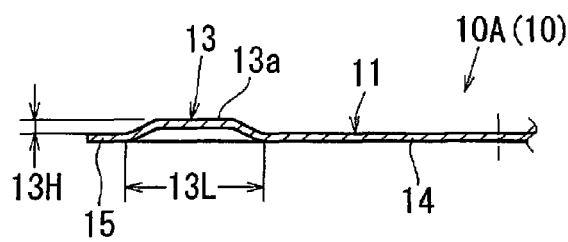
FIG. 31 is a cross-sectional view along line XXXI-XXXI in FIG. 29.

This disclosure is not limited to the above-mentioned embodiments, and modifications can be made without departing from the substance of this disclosure. For example, means for increasing rigidity of the protrusion, and/or means for decreasing rigidity of the protrusion can be changed as necessary. The technical features of the embodiments may be used independently or in combination with each other. The shape of the protrusion (standard protrusion, reinforced protrusion, weakened protrusion) of the tolerance ring 10 may be changed as necessary. The protrusion (standard protrusion, reinforced protrusion, weakened protrusion) of the tolerance ring 10 is not limited to one projecting outwardly in the radial direction, and may project inwardly in the radial direction as shown in FIG. 25. Here, the torque transmission device shown in FIG. 25 is a variant of the first embodiment, so corresponding components are labeled with the same symbols, respectively. The tolerance ring is mainly used for the torque transmission device, however it can be used to prevent backlash between an inner axial member and an outer axial member of a hinge device such as door. In addition, it is assumed that the tolerance ring is placed between an inner axial member and an outer axial member such that peripheral edge areas overlap in the radial direction. In this case, the peripheral edge areas may separate in the radial direction, and may contact with each other.

EXPLANATIONS OF NUMERALS 10 tolerance ring
11 ring body
12 gap
13 protrusion (standard protrusion)
13A, 13B, 13C reinforced protrusion
14 central area
15 end area
16 edge area
16a edge portion
17 even area
131 reinforced protrusion
132 edge reinforcing portion (reinforced protrusion)
133 reinforced protrusion
134 reinforced protrusion
135 weakened protrusion
136 even area
137 weakened protrusion
138 groove
S1 inner axial member
S2 outer axial member
T torque transmission device

The invention claimed is:

1. A tolerance ring for torque transmission comprising:
a ring body made of an elastic plate and formed in a substantially hollow cylinder shape having a pair of edges comprising a first edge and a second edge, each of the first edge and the second edge extending in an axial direction;
wherein the ring body includes a plurality of protrusions radially projecting outwardly and arranged in a circumferential direction, a first region, and a second region having a portion positioned diametrically opposed to the first region, the plurality of protrusions including a first plurality of protrusions positioned at the first region and having a first protrusion proximate the first edge and a second protrusion proximate the second edge, each of the first plurality of protrusions defining a first congruent shape, and a second plurality of protrusions positioned at the second region, including at the portion positioned diametrically opposed to the first region, the second plurality of protrusions including a first protrusion adjacent the first protrusion of the first plurality and a second protrusion adjacent the second protrusion of the first plurality, each of the second plurality of protrusions defining a second congruent shape, the second shape being larger than the first shape;
wherein the first protrusion of the first plurality and the first protrusion of the second plurality are circumferentially consecutive and define a first spacing distance there between, and the second plurality of protrusions is defined by circumferentially consecutive protrusions between the first and second protrusions of the first plurality of protrusions and each pair of circumferentially consecutive second plurality of protrusions defining a second spacing distance there between, the first spacing distance is less than the second spacing distance, and the first plurality of protrusions and the second plurality of protrusions are aligned in the circumferential direction.

2. The tolerance ring according to claim 1, wherein a rigidity of the first protrusion of the first plurality of protrusions is greater than a rigidity of each of the protrusions of the second plurality of protrusions and a rigidity of the second protrusion of the first plurality of protrusions is greater than the rigidity of each of the protrusions of the second plurality of protrusions.

3. The tolerance ring according to claim 1, wherein a width of the first protrusion of the first plurality of protrusions is less than a width of each of the protrusions of the second plurality of protrusions and a width of the second protrusion of the first plurality of protrusions is less than the width of each of the protrusions of the second plurality of protrusions.

4. The tolerance ring according to claim 3, wherein the pair of the edges has at least one radially convex or concave portion, and the protrusions in the first region and the second region are each formed in a hipped roof shape that is substantially a rectangular shape.

5. The tolerance ring according to claim 1, wherein the pair of edges has at least one convex or concave edge extending in a radial direction.

6. The tolerance ring according to claim 1, wherein rigidity of the protrusions in the second region is less than rigidity of the protrusions in the first region.

7. The tolerance ring according to claim 6, wherein a height of at least one of the protrusions in the first region is less than heights of the other protrusions in the second region.

8. The tolerance ring according to claim 6, wherein a distance between the protrusions adjacent to each other in the second region is wider than intervals between the protrusions in the first region.

9. The tolerance ring according to claim 6, wherein a circumferential width of at least one of the protrusions is broader than widths of other protrusions in the second region.

10. The tolerance ring according to claim 6, wherein the ring body has a slit axially extending in the second region.

11. The tolerance ring according to claim 6, wherein heights of two protrusions are lower than heights of the other protrusions in the second region, and a circumferential distance between one of the two protrusions and one of the edges is equal to a circumferential distance between the other of the two protrusions and the other of the edges.

12. The tolerance ring according to claim 1, wherein the first protrusion of the first plurality abuts the first protrusion of the second plurality, and the second protrusion of the first plurality abuts the second protrusion of the second plurality.

13. The tolerance ring according to claim 1, further comprising a first edge reinforcing portion located between the first protrusion of the first plurality of protrusions and the first edge, and a second edge reinforcing portion between the second protrusion of the first plurality of protrusions and the second edge.

14. The tolerance ring according to claim 1, wherein each of the first edge and the second edge is curved along a surface extending in a radial direction.

\* \* \* \* \*